Patented Oct. 17, 1933

1,931,021

UNITED STATES PATENT OFFICE 1,931,021

PROCESS FOR PREPARING PYRANTHRONE

William Dettwyler, Milwaukee, Wis., assignor, by mesne assignments, to E. I. du Pont de Nemours & Company, a corporation of Delaware No Drawing. Application May 21, 1930
Serial No. 454,527

7 Claims. (Cl. 260—61)

This invention relates to the manufacture of pyranthrone and more particularly, to an improved process of manufacturing this compound by the caustic potash fusion of 2,2'-dimethyl-1,1'-dianthraquinonyl.

Pyranthrone is an important technical product, being useful both as a dyestuff by itself, and as an intermediate for other dyestuffs.

Several methods are described in the literature for the preparation of this product, of which the most important are the following:

1. The condensation of 2,2'-dimethyl-1,1'-dianthraquinonyl by fusion with a caustic potash-alcohol mixture;

2. The simultaneous reduction and condensation of 1,1'-dianthraquinonyl-2,2'-dialdehyde;

3. The condensation of the compound obtained by diazotizing 1-amino-2-methyl-anthraquinone.

Of these methods, the first is the oldest and the one most generally employed in practice. As described in the literature and as generally carried out today, this process comprises heating 2,2'-dimethyl-1,1'-dianthraquinonyl with a large excess of caustic potash and methyl or ethyl alcohol at a temperature ranging from 140 to 170° C. The ratio of alcohol to the dianthraquinonyl compound is generally about 2.6 to 5 parts by weight, while the amount of caustic potash usually varies from 3 to 15 times the weight of the dimethyl-dianthraquinonyl. (See, for instance, U. S. Patent No. 856,811 to Scholl.)

I have now found that such a great excess of caustic potash is entirely unnecessary, and that the reaction will proceed successfully even if the amount of caustic potash used is as low as ½ the weight of the dianthraquinonyl compound. I have further discovered that the reaction will proceed successfully, and with decided improvement over the old process by using temperatures substantially lower than those heretofore used. Thus, highly satisfactory results are obtained, for example, by employing a temperature around 125° C.

Reduction in the amount of caustic potash decreases its binding effect upon the alcohol and increases the tendency of the latter to evaporate. I therefore prefer to carry out the reaction in a closed vessel whereby to retain the alcohol in the reaction mixture at the temperature employed, and to keep the mass capable of agitation.

It is, accordingly, an object of this invention to provide an economical, efficient process for preparing pyranthrone of a high degree of purity.

It is a further object of this invention to provide a process for preparing pyranthrone by fusing 2,2'-dimethyl-1,1'-dianthraquinonyl with a lower ratio of caustic potash and at a lower temperature than are employed in known processes.

Other and further important objects of this invention will become apparent from the following description and appended claims.

In its broadest aspect, my invention may be said to consist of a process of fusing 2,2'-dimethyl-1,1'-dianthraquinonyl in alcoholic-potash at a lower temperature than heretofore practiced and with a much lower ratio of caustic potash to the dianthraquinonyl compound. Specifically our invention is illustrated in the following example in which parts by weight are given:

Example 100 parts of 2,2'-dimethyl-1,1'-dianthraquinonyl, 300 parts of grain alcohol and 50 parts of caustic potash (fused) are charged into an autoclave and heated slowly under pressure and agitation to about 125° C. The reaction mass is maintained at this temperature and pressure under agitation for about 16 hours whereupon it is cooled to room temperature; 300 parts of water are now added and the alcohol is distilled off. The mass is then diluted with 2500 parts of water, aerated and boiled in the usual manner; filtered; and washed with water until alkali free. The product consists of an orange paste, which upon drying, yields an orange powder analyzing about 99% pyranthrone.

It will, of course, be understood that the details of procedure may be varied within wide limits without departing from the spirit of this invention. Thus, although I have particularly described my invention as using a caustic potash-dianthraquinonyl ratio of 50:100, advantageous results considerably improved over the prior art, may be obtained by using somewhat higher ratios, say up to 100:100. Similarly, the temperature of the reaction may vary considerably as long as it is not higher than 140° C. 100° C. or even lower temperatures give successful results. The amount of alcohol employed may vary within wide limits. 2 to 5 parts (by weight) of alcohol to 1 part of the dianthraquinonyl body are ratios frequently found in the old practice in this art. However, satisfactory results may be obtained even by using an alcohol-dianthraquinonyl ratio several times the upper limit mentioned. The strength of the alcohol may similarly vary. Either grain alcohol or 80% alcohol will give good results. Wood alcohol may be used, if desired. Many other minor changes, obvious to those skilled in the art, may be worked into the specific scheme of the process.

The particular advantages accruing from a process employing the low caustic potash ratio and low reaction temperature range disclosed, are two-fold. In the first place, the cost of the final product is greatly reduced due to the material saving in caustic potash, which is generally allowed to go to waste after the completion of the reaction. In the second place, the lower concentration of caustic potash together with the lower temperature diminish the destructive effect of the caustic potash upon the finished product, with the result that the pyranthrone is obtained in a state of purity as high as about 99% after dilution with water, aeration, and isolation in the usual way, as compared with a purity of 94% in the methods heretofore generally practiced. Thus it can be seen that the amount of impurities in the dyestuff prepared by my method is reduced to ⅙ of the amount generally present in this product as now prepared.

While I have disclosed the preferred form of my invention, it is to be understood that I do not propose to be limited in the patent granted except as necessitated by the prior art.

I claim as my invention:

1. The process of preparing pyranthrone, which comprises heating in a closed vessel 2,2'-dimethyl-1,1'-dianthraquinonyl with alcoholic-potash at a temperature of about 125° C.

2. The process of preparing pyranthrone, which comprises heating in a closed vessel 2,2'-dimethyl-1,1'-dianthraquinonyl with alcoholic-potash at a temperature below 140° C.

3. The process of preparing pyranthrone, which comprises heating in a closed vessel at a temperature between 100 and 140° C., 2,2'-dimethyl-1,1'-dianthraquinonyl in the presence of alcohol, with an amount of caustic potash less than the weight of said dianthraquinonyl compound.

4. The process of preparing pyranthrone, which comprises heating in a closed vessel at a temperature of about 100 to 140° C., 2,2'-dimethyl-1,1'-dianthraquinonyl with an amount of caustic potash less than the weight of said dianthraquinonyl compound and in the presence of an amount of alcohol in excess of the weight of said dianthraquinonyl body.

5. The process of preparing pyranthrone, which comprises heating in a closed vessel, 2,2'-dimethyl-1,1'-dianthraquinonyl with an amount of caustic potash equal to about ½ the weight of the dianthraquinonyl body and in the presence of alcohol.

6. The process of preparing pyranthrone, which comprises heating in a closed vessel 2,2'-dimethyl-1,1'-dianthraquinonyl with about 0.50 to 1.00 times its own weight of caustic potash, and in about 2 to 5 times its own weight of alcohol at a temperature of about 100 to 140° C.

7. The process of preparing pyranthrone which comprises heating in a closed vessel at a temperature of about 125° C. a reaction mass comprising substantially 1 part of 2,2'-dimethyl-1,1'-dianthraquinonyl, 0.5 parts of caustic potash and 3 parts of alcohol.

WILLIAM DETTWYLER.